(12) United States Patent
Hogan

(10) Patent No.: US 7,058,702 B2
(45) Date of Patent: Jun. 6, 2006

(54) EFFICIENT VALIDATION OF NETWORK CONFIGURATION CHANGE COMMANDS

(75) Inventor: Dirk Hogan, Columbia, MO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 778 days.

(21) Appl. No.: 10/038,205

(22) Filed: Jan. 4, 2002

(65) Prior Publication Data

US 2003/0131077 A1    Jul. 10, 2003

(51) Int. Cl.
*G06E 15/177*    (2006.01)

(52) U.S. Cl. ................. 709/220; 709/223; 709/226; 709/213

(58) Field of Classification Search .............. 709/220, 709/221, 222, 223, 226, 213
See application file for complete search history.

(56) References Cited

U.S. PATENT DOCUMENTS

| | | | |
|---|---|---|---|
| 6,026,462 A * | 2/2000 | George et al. .............. 711/2 |
| 6,546,457 B1 * | 4/2003 | Don et al. .................... 711/114 |
| 6,654,830 B1 * | 11/2003 | Taylor et al. ................. 710/74 |
| 6,874,046 B1 * | 3/2005 | LeCrone et al. .............. 710/74 |
| 2002/0032850 A1 * | 3/2002 | Kauffman ..................... 712/31 |
| 2003/0023811 A1 * | 1/2003 | Kim et al. .................... 711/114 |
| 2003/0055932 A1 * | 3/2003 | Brisse .......................... 709/223 |
| 2003/0061491 A1 * | 3/2003 | Jaskiewicz et al. ......... 713/182 |

\* cited by examiner

*Primary Examiner*—Zarni Maung
*Assistant Examiner*—Nghi Tran

(57) ABSTRACT

An improved method is provided for validating network configuration change commands in a storage area network. The improved method includes: providing a change command to a network management device residing in the network, where the change command expresses a change to the configuration of the network and implicitly indicates an initial configuration state of the network therein; determining a current configuration state for the network; and implementing the change command when the change command is expressed in terms of the current configuration state of the network.

13 Claims, 3 Drawing Sheets

EFFICIENT VALIDATION OF NETWORK CONFIGURATION CHANGE COMMANDS

FIELD OF THE INVENTION

The present invention relates generally to storage management in a distributed network environment and, more particularly, to an efficient method for validating network change commands in a storage area network.

BACKGROUND OF THE INVENTION

Management of storage resources is an essential aspect of implementing and maintaining storage area networks. Storage management may encompass a broad range of storage functions including file access, volume management and data backup. Of particular interest, storage management includes the ability to dynamically allocate individual storage units to shared storage groups and/or specific storage servers.

Dynamically allocating storage units is typically achieved through change commands issued from one or more of the client workstations having access to the storage area network. Because change commands can be scheduled for execution at a later time and can be issued (possibly concurrently) by several client workstations, it is important to verify the appropriateness of each change command before the request is implemented in the network. Specifically, it is necessary to determine if the desired changes embodied in the change commands are expressed in terms of the current network configuration.

Therefore, it is desirable to provide an improved method for validating network change commands in a storage area network.

SUMMARY OF THE INVENTION

In accordance with the present invention, an improved method is provided for validating network configuration change commands in a storage area network. The improved method includes: providing a change command to a network management device residing in the network, where the change command expresses a change to the configuration of the network and implicitly indicates an initial configuration state of the network therein; determining a current configuration state for the network; and comparing the initial configuration state indicated by the change command to the current configuration state of the network. The change command is implemented by the network management device when the initial configuration state indicated by the change command correlates to the current configuration state of the network.

For a more complete understanding of the invention, its objects and advantages, reference may be had to the following specification and to the accompanying drawings.

DETAILED DESCRIPTION OF THE PREFERRED EMBODIMENTS

Figure 1:
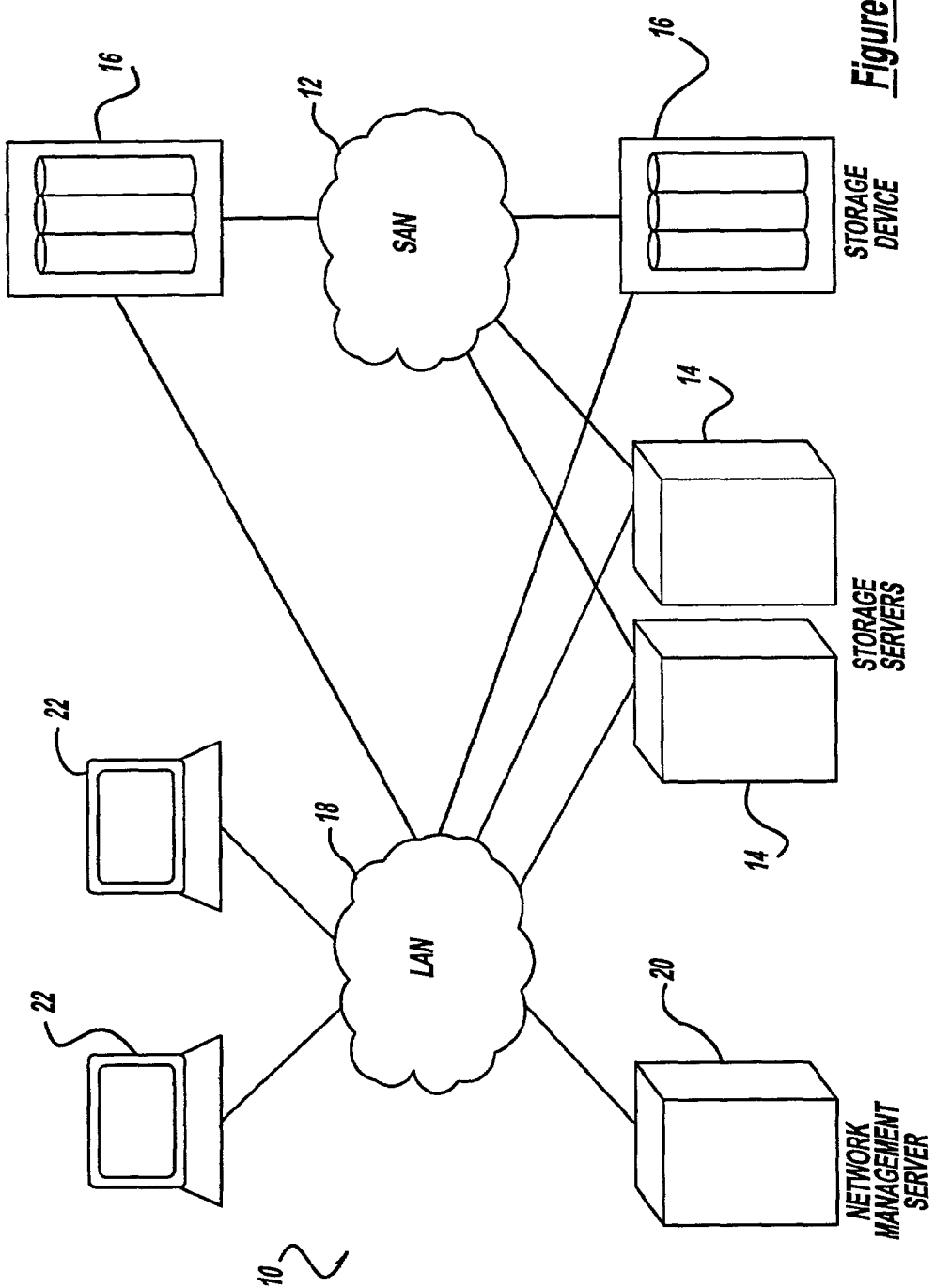
FIG. 1 is a block diagram of an exemplary distributed network environment that includes a storage area network in accordance with the present invention.

FIG. 1 illustrates a distributed network environment 10 that includes a storage area network 12. Specifically, the storage area network 12 includes one or more storage servers 14 as well as one or more storage devices 16. Each storage device 16 further includes a plurality of storage units. Storage servers 14 provide access to the storage units embodied in the storage devices 16 as is well known in the art. It is readily understood that the storage area network 10 may employ various network topologies. While the following description is provided with reference to a storage area network, it is readily understood that the present invention is applicable to other types of distributed data storage networks.

Management of storage resources is administered by a network management server 20. Change commands are typically used to express one or more requests to change the configuration of the network as is well known in the art. Change commands may be issued from any one of various client workstations 22 residing in the network environment 10. The changes to the network configuration are then implemented by the network management server 20. The network management server 20 may be interconnected via a local area network (LAN) to the client workstations 22 and the storage servers 14. Because change commands can be scheduled for execution at a later time and can be issued by several client workstations (possibly concurrently), it is important to verify the appropriateness of each change command set. In particular, it is necessary to determine if the desired changes embodied in a change command are expressed in terms of the current network configuration.

In accordance with the present invention, an improved method is provided for validating change commands in a distributed network environment. The improved method relies upon the realization that any delta, such as a change command set, implicitly indicates an initial state. In other words, a change cannot exist autonomously, but rather exists relative to an initial state. Likewise, network change commands implicitly indicate an initial configuration state of the network. Thus, it is possible to check if the initial configuration state expressed in a given change command corresponds to the current configuration state of the network.

Figure 2:
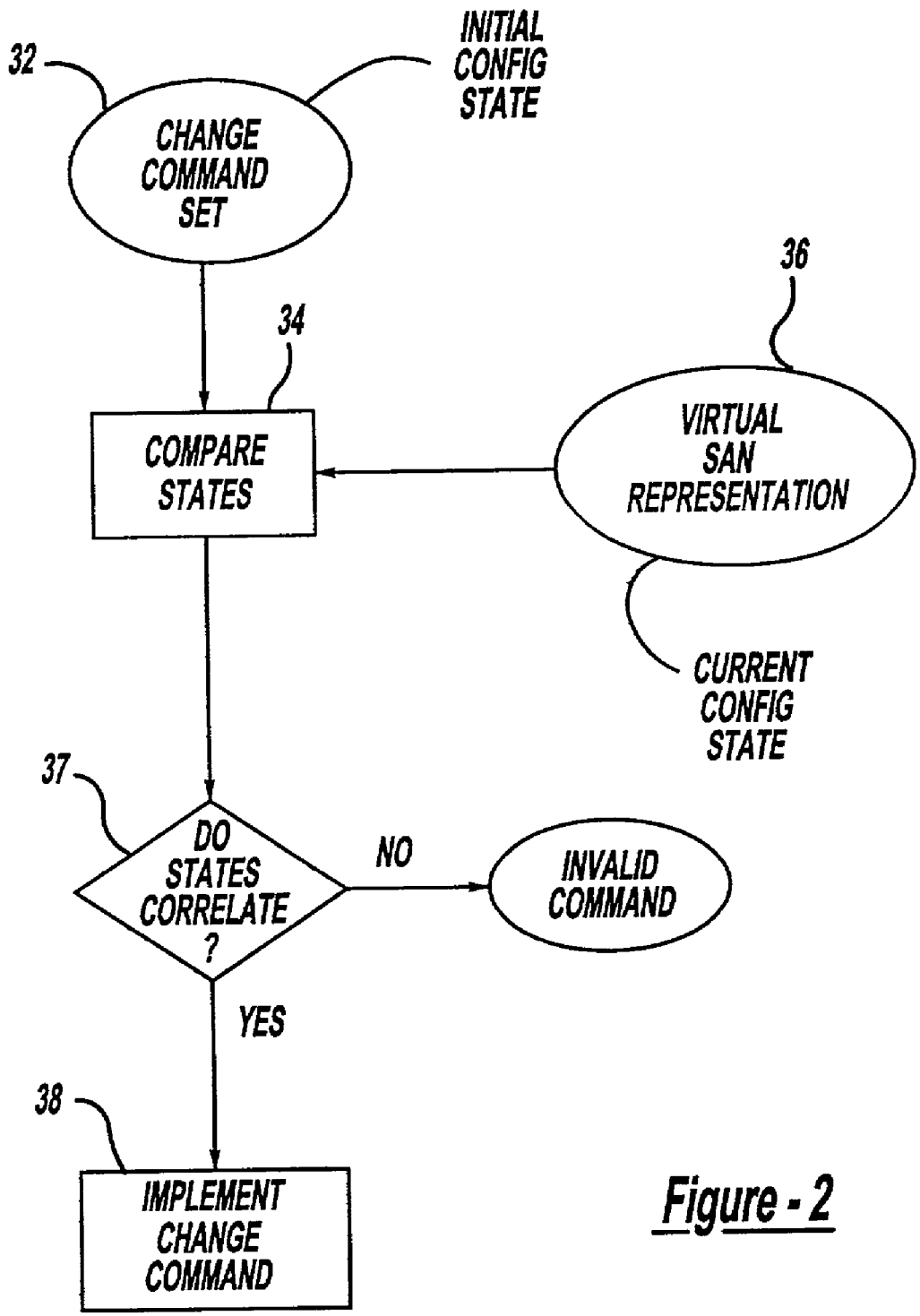
FIG. 2 is a flowchart of an improved method for validating network change commands in accordance with the present invention.

Referring to FIG. 2, a change command set 32 is compared at step 34 to a virtual representation 36 of the physical network configuration. The virtual representation 36 is a detailed model of the physical state of the network as is well known in the art. Thus, the virtual representation 36 expresses the current configuration state of the network. If the change command was defined relative to the current state of the network, then the change commands are implemented at step 38 by the network management server. On the other hand, if the change command does not correlate to the current state of the network, then the change command is deemed an invalid request. In this way, an improved method is provided for validating network change commands in a distributed network environment.

Storage allocation commands may be used to dynamically configure storage resources within a network environment. Storage allocation is generally implemented using two fundamental change commands: assign and unassign. When an individual storage unit is assigned to a storage server (also referred to as a host), the server is granted read-write access to the assigned storage unit. Conversely, when an storage unit is unassigned from a server, the storage unit is no longer available to the server.

Storage allocation is also facilitated through the use of security groups. Security groups enable the grouping of and access to related storage units. For illustration purposes, two different types of security groups are described below. However, it is envisioned that other types of groups are also within the broader aspects of the present invention.

First, shared groups allow multiple hosts to share the same set of storage units with read-write access. When a host is assigned to a shared group, all of the storage in the shared group is assigned to the host. When a host is unassigned from a shared group, all of the storage in the shared group is unassigned from the host. Similarly, when a storage unit is assigned to a shared group, it is automatically assigned to each host in the shared group. When a storage unit is unassigned from a shared group, it is automatically unassigned from each host in the shared group.

Second, associated LUN groups are used to group storage units (also referred to as logical units) that can be assigned and unassigned as a group. For instance, associated LUN groups may be used to group stripe sets, mirror sets, and sets of storage units that contain parts of the same database. When an associated LUN group is assigned to a host or shared group, all of the storage units in the associated LUN group are assigned to the particular host or all of the hosts in the shared group. When an associated LUN group is unassigned from a host or shared group, all of the logical units in the associated LUN group are unassigned from the affected hosts. Similarly, if a storage unit is added to an associated LUN group that is assigned to a host or shared group, then the newly assigned storage unit is automatically assigned to the particular host or all of the hosts in the shared group. If the storage unit is unassigned from an associated LUN group, then the unassigned storage unit is automatically unassigned from the affected hosts.

To further illustrate the validation method of the present invention, a preferred implementation of the methodology as applied to these exemplary storage allocation commands is set forth below. Specifically, a validation method is provided for the following six assign commands: (1) assign storage unit to host; (2) assign storage unit to shared group; (3) assign storage unit to associated LUN group; (4) assign associated LUN group to host; (5) assign associated LUN group to shared group; and (6) assign host to shared group. To simplify the discussion, the first three assign commands are referred to as "simple assign commands"; whereas the remaining three assign commands are referred to as "complex assign commands".

Figure 3:
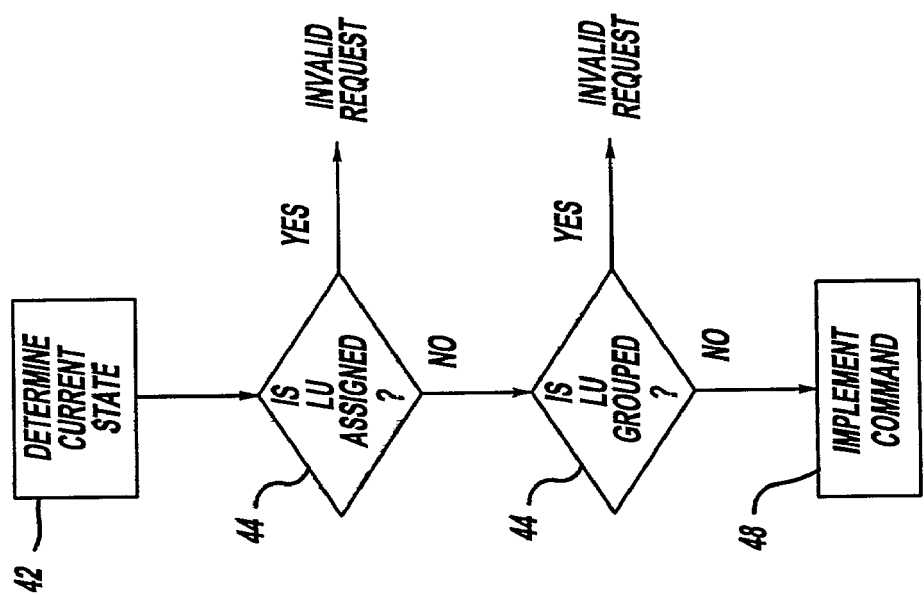
FIG. 3 is a flowchart of an exemplary validation algorithm for simple assign commands in accordance with the present invention.

FIG. 3 illustrates a preferred validation algorithm for each of the simple assign commands. In each of these commands, an individual storage unit is being assigned to either a host, a shared group or an associated LUN group. Implicitly expressed in each of these commands is that the individual storage unit is not assigned or grouped in the current network configuration. Accordingly, the validation algorithm will confirm this configuration state for the individual storage unit.

First, determine the current configuration state for the storage unit at step 42. If the storage unit is currently assigned, then it is not available to be assigned (without first being unassigned) and thus the assign command is an invalid request. Conversely, if the storage unit is currently unassigned, then determine if the storage unit is grouped at step 44. If the storage unit is currently grouped, then it is not available to be assigned (independently from its grouping) and thus the assign command is invalid. However, if the storage unit is not currently assigned or grouped, then it may be assumed that the assign command is expressed in terms of the current network configuration, and therefore is a valid change command.

Figure 4:
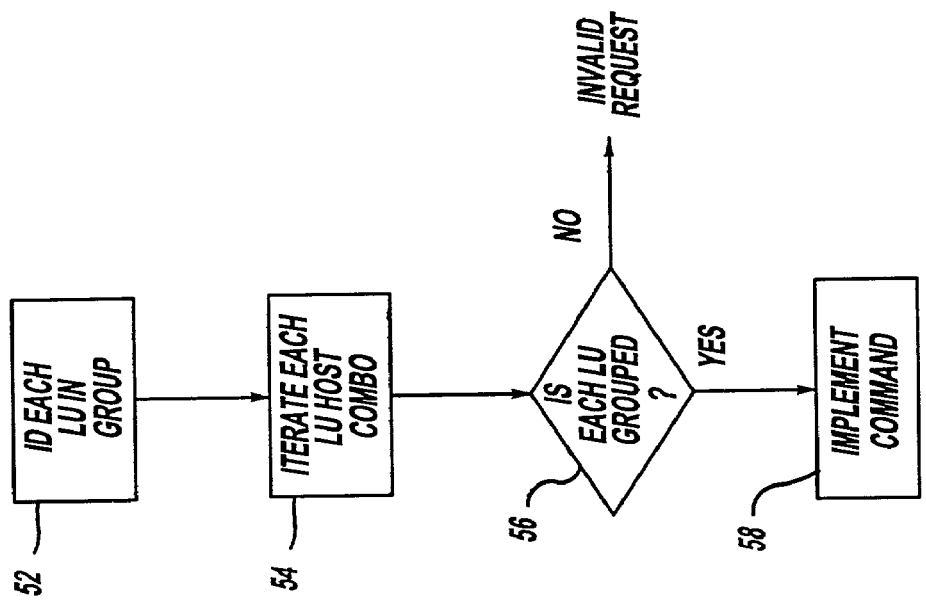
FIG. 4 is a flowchart of an exemplary validation algorithm for complex assign commands in accordance with the present invention.

An additional validation algorithm for the complex assign commands is shown in FIG. 4. Each of these commands involves the assignment of multiple storage units. Implicitly expressed in each of these commands is that each individual storage unit is part of either a shared group or an associated LUN group in the current network configuration. Accordingly, the validation algorithm will confirm this configuration state for each individual storage unit.

Initially, each storage unit in a particular grouping is identified at step 52. For instance, in the case of an associated LUN group being assigned to a host, each storage unit in the LUN group is identified. In the case of an associated LUN group being assigned to a shared group, each storage unit in the LUN group is identified. Additionally, each host associated with the shared group is also identified. Lastly, in the case of the host being assigned to a shared group, each storage unit in the shared group is identified. The composition of an associated LUN group or a shared group is easily ascertained from the virtual representation of the physical network as is known in the art.

Next, the applicable storage unit—host combinations are iterated for each assign command at step 54. Each storage unit can then be checked to determine if it belongs to a group at step 56. If the storage unit is not currently grouped, then there has been a change in the network configuration and thus the assign command is invalid. If the storage unit is currently grouped, then the assign command is valid as it relates to this particular storage unit. This process is repeated for each storage unit identified for a particular grouping. If each of the storage units are currently grouped, then it may be assumed that the assign command is expressed in terms of the current network configuration, and therefore is a valid change command. One skilled in the art will readily recognize that other verification steps may also be incorporated into this validation algorithm.

Lastly, a validation algorithm may be implemented for an unassign command. An unassign command implicitly indicates that the storage unit to be unassigned is currently assigned within the network. Therefore, an exemplary validation technique is to determine if the storage unit is currently assigned within the network. If the storage unit is currently assigned, then it may be assumed that the assign command is expressed in terms of the current network configuration, and thus is a valid change command. On the other hand, if the storage unit is not currently assigned, then the command is invalid.

Although these various validation algorithms are presently preferred, they are not intended as a limitation on the broader aspects of the present invention. For instance, it is envisioned that other validation algorithms may be suitable for validating these particular storage allocation commands. Moreover, it is envisioned that other validation techniques based on change commands that are expressed in terms of the current network configuration are also within the scope of the present invention. In other words, while the invention has been described in its presently preferred form, it will be understood that the invention is capable of modification without departing from the spirit of the invention as set forth in the appended claims.

What is claimed is:

1. A method for validating network configuration change commands in a network environment, comprising:
   providing a change command to a network management device residing in the network, the change command expresses a change to the configuration of the network and implicitly indicates an initial configuration state of the network;
   determining a current configuration state of the network;
   comparing the initial configuration state indicated by the change command to the current configuration state of the network; and
   implementing the change command when the initial configuration state indicated by the change command correlates to the current configuration state of the network; disregarding the change command as being an invalid request when the initial configuration state indicated by the change command does not correlate to the current configuration state of the network.

2. The method of claim 1 wherein the step of determining a current configuration state of the network further comprises accessing a virtual representation of the network configuration.

3. The method of claim 1 wherein the change command is further defined as an assign command that establishes an association between a storage unit to a storage server, where the assign command implicitly indicates that the storage unit is currently not assigned within the network.

4. The method of claim 1 wherein the change command is further defined as an unassign command that disassociates a storage unit from a storage server, where the unassign command implicitly indicates that the storage unit is currently assigned within the network.

5. A method for validating storage allocation commands in a storage area network, comprising:
   providing a storage allocation command to a network management device residing in the network, the storage allocation command expresses a change to the configuration of storage resources and implicitly indicates an initial configuration state of the storage resources in the network;
   determining a current configuration state of the storage resources in the network;
   determining if the storage allocation command is expressed in terms of the current configuration state of the network; and
   implemented the storge allocation command when the storage allocation command is expressed in terms of the current configuration state of the network; disregarding the storage allocation command as being an invalid request when the storage allocation command is not expressed in terms of the current configuration state of the network.

6. The method of claim 5 further comprising:
   providing an assign command to the network management device, where the assign command establishes an association between a storage unit to a storage server, thereby granting the storage server read-write access to the storage unit;
   determining if the storage unit is currently assigned in the network; and
   implementing the assign command when the storage unit is currently unassigned in the network.

7. The method of claim 5 further comprising:
   providing an unassign command to the network management device, where the unassign command disassociates a storage unit from a storage server;
   determining if the storage unit is currently assigned in the network; and
   implementing the unassign command when the storage unit is currently assigned in the network.

8. The method of claim 5 wherein the storage allocation command is selected for the group consisting of: assigning a storage unit to a storage server; assigning a storage unit to a shared group; and assigning a storage unit to an associated LUN group.

9. The method of claim 8 wherein the storage allocation command implicitly indicates that the storage unit is not currently assigned to either the storage server or the associated LUN group and is not currently grouped in the shared group.

10. The method of claim 8 further comprising:
    determining if the storage unit is currently assigned in the network;
    determining if the storage unit is currently grouped in the network; and
    implementing the storage allocation command when the storage unit is currently not assigned and not grouped in the network.

11. The method of claim 5 wherein the storage allocation command is selected from the group consisting of: assigning an associated LUN group to a storage server; assigning an associated LUN group to a shared group; and assigning a storage server to a shared group.

12. The method of claim 11 wherein the storage allocation command implicitly indicates that each storage unit implicated by the command is associated with at least one of the associated LUN group and the shared group.

13. The method of claim 12 further comprising:
    determining each storage unit associated with at least one of the associated LUN group and the shared group;
    determining if each storage unit is currently grouped in the network; and
    implementing the storage allocation command when each of the storage units is currently grouped in the network.

* * * * *